United States Patent
Hirono

(10) Patent No.: US 8,229,206 B2
(45) Date of Patent: Jul. 24, 2012

(54) PHOTOMASK INSPECTION METHOD

(75) Inventor: Masatoshi Hirono, Kanagawa (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 564 days.

(21) Appl. No.: 12/546,963

(22) Filed: Aug. 25, 2009

(65) Prior Publication Data

US 2010/0074512 A1   Mar. 25, 2010

(30) Foreign Application Priority Data

Sep. 25, 2008   (JP) .................................. 2008-245089

(51) Int. Cl.
- *G06K 9/00* (2006.01)
- *G01N 21/00* (2006.01)
- *G01N 21/86* (2006.01)
- *G01V 8/00* (2006.01)

(52) U.S. Cl. ..... 382/144; 382/145; 382/149; 356/239.1; 356/239.2; 356/239.3; 356/239.4; 356/239.5; 356/239.6; 356/239.7; 356/239.8; 250/559.41

(58) Field of Classification Search .................... 382/144
See application file for complete search history.

(56) References Cited

U.S. PATENT DOCUMENTS

| | | | | |
|---|---|---|---|---|
| 3,813,173 A | * | 5/1974 | Teter | 356/239.7 |
| 4,958,083 A | * | 9/1990 | Sakamoto | 250/559.41 |
| 5,563,702 A | | 10/1996 | Emery et al. | |
| 5,774,575 A | * | 6/1998 | Tanaka et al. | 382/149 |
| 6,282,309 B1 | * | 8/2001 | Emery | 382/145 |

FOREIGN PATENT DOCUMENTS

JP   8-76359   3/1996

* cited by examiner

*Primary Examiner* — Ryan Zeender
*Assistant Examiner* — Allen Chein
(74) *Attorney, Agent, or Firm* — Oblon, Spivak, McClelland, Maier & Neustadt, L.L.P.

(57) ABSTRACT

A photomask inspection method that identifies a foreign particle such as dirt on a photomask with high sensitivity by suppressing erroneous identification due to an influence of noise is provided. The photomask inspection method includes acquiring image data of a photomask having regions with different layer structures on a surface thereof, creating inverted image data by subtracting the image data from pixel value data of the regions, creating offset inverted image data by raising pixel values of the inverted image data by a fixed amount, creating normalized correlation image data by computing a normalized correlation of the offset inverted image data and an offset Gaussian distribution-type kernel, and identifying foreign particles by comparing the normalized correlation image data and a predetermined threshold.

2 Claims, 10 Drawing Sheets

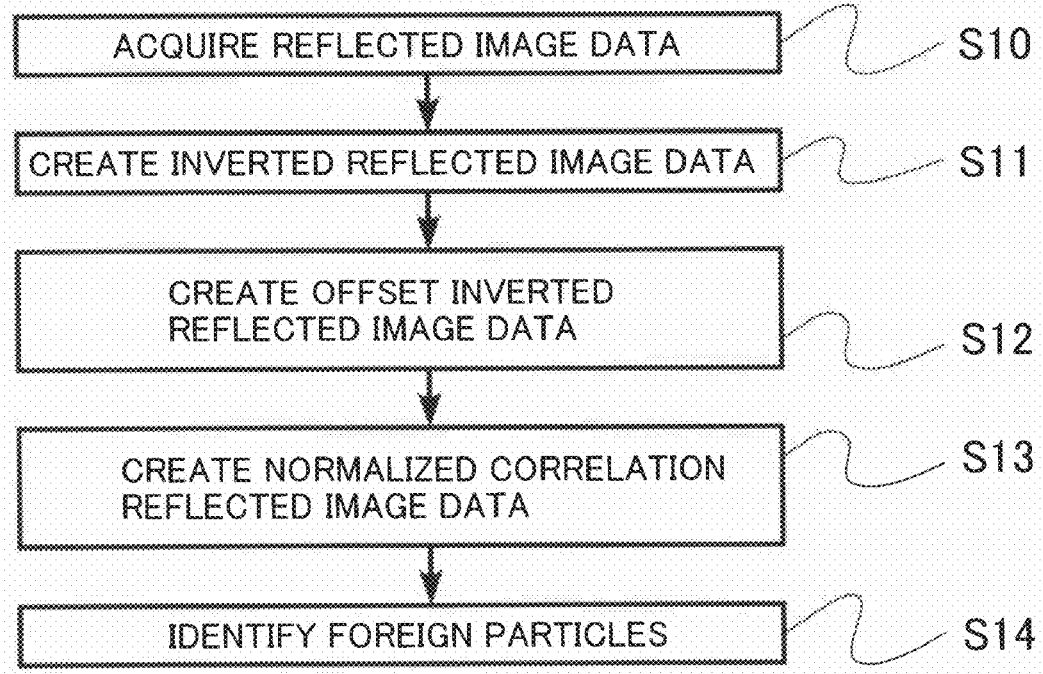
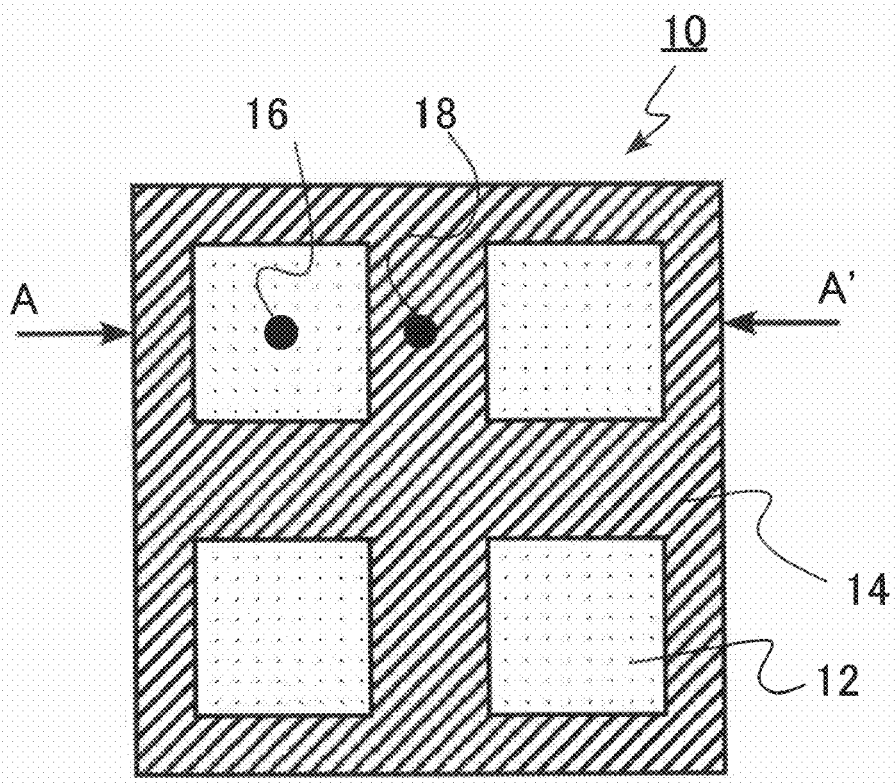

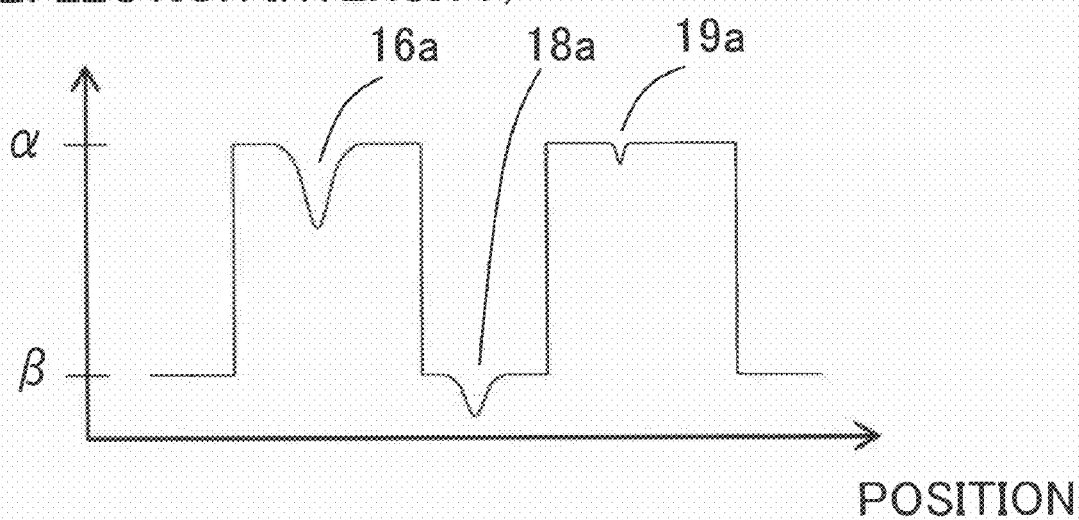

PHOTOMASK INSPECTION METHOD

CROSS-REFERENCE TO RELATED APPLICATION

This application is based upon and claims the benefit of priority from Japanese Patent Applications No. 2008-245089, filed on Sep. 25, 2008, the entire contents of which are incorporated herein by reference.

FIELD OF THE INVENTION

The present invention relates to a photomask inspection method that identifies a foreign particle such as dirt on a photomask with high sensitivity.

BACKGROUND OF THE INVENTION

A semiconductor is generally fabricated by projecting a pattern formed in a photomask (hereinafter, also referred to as a mask) on a wafer onto which a resist is applied. That is, the mask assumes the role of a negative in a camera. If the mask has a defect, the defect will be transferred to all wafers fabricated by using the mask. Thus, a defect inspection of mask plays an extremely important role in a semiconductor fabrication process.

A method of pattern-to-pattern comparison on a mask (die-to-die) and that of inspection using design data of a mask (die-to-database) are known as methods of the defect inspection of mask. Both these inspection methods cannot inspect a mask region without pattern information. Actually, however, it is necessary to inspect for defects, among others, foreign particle also in a region without pattern information such as a scribe area of mask.

Methods described, for example, in JP-A H08-76359 (KOKAI) are well known as inspection methods of a mask region without pattern information. These methods include, for example, as shown in FIG. 13, a method by which a region 91 within which a relationship between a reflected image (horizontal axis R in FIG. 13) and a transmitted image (vertical axis T in FIG. 13) of each point where there is no mask defect always stays is set and points deviating from the region 91 are determined as defects. This method is effective under ideal conditions under which there is no relative position shift between a reflected image and a transmitted image and there is almost no noise. Actually, however, there are cases of deviation from the region 91 without defect or incorporation of defect into the region 91 due to an influence of a relative position shift between a reflected image and a transmitted image or noise. This is a phenomenon frequently observed particularly in pattern edges. As countermeasures to prevent a relative position shift between a reflected image and a transmitted image, as shown in FIG. 14, a method by which a region 92 within which a relationship between a reflected image (horizontal axis R in FIG. 14) and a second derivative image (vertical axis R" in FIG. 14) thereof always stays is set and points deviating from the region 92 are determined as defects and, as shown in FIG. 15, a method by which a region 93 within which a relationship between a transmitted image (horizontal axis T in FIG. 15) and a second derivative image (vertical axis T" in FIG. 15) thereof always stays is set and points deviating from the region 93 are determined as defects are also proposed in JP-A H08-76359 (KOKAI).

Indeed, even the methods by JP-A H08-76359 (KOKAI) do not take sufficient steps against erroneous identification due to an influence of noise.

SUMMARY OF THE INVENTION

A photomask inspection method according to an embodiment of the present invention includes acquiring image data of a photomask having regions with different layer structures on a surface thereof, creating inverted image data by subtracting the image data from pixel value data of the regions, creating offset inverted image data by raising pixel values of the inverted image data by a fixed amount, creating normalized correlation image data by computing a normalized correlation of the offset inverted image data and a offset Gaussian distribution-type kernel, and identifying foreign particles by comparing the normalized correlation image data and a predetermined threshold.

A photomask inspection method according to an other embodiment of the present invention includes acquiring reflected image data and transmitted image data of a photomask having a glass region and a film region formed on the glass on a surface thereof, creating inverted reflected image data by subtracting the reflected image data from pixel value data of the glass region and the film region, creating offset inverted reflected image data by raising pixel values of the inverted reflected image data by a fixed amount, creating normalized correlation reflected image data by computing a normalized correlation of the offset inverted reflected image data and a offset Gaussian distribution-type kernel, identifying foreign particle candidates by comparing the normalized correlation reflected image data and a predetermined threshold, creating offset transmitted image data by subtracting the pixel value data of the film region from the transmitted image data and then raising the pixels values by the fixed amount, creating normalized correlation transmitted image data by computing a normalized correlation of the offset transmitted image data and the offset Gaussian distribution-type kernel, identifying holes by comparing the normalized correlation transmitted image data and the predetermined threshold, and determining, among the foreign particle candidates, those foreign particles that are not located at the same position as the holes as true foreign particles.

BRIEF DESCRIPTION OF THE DRAWINGS

FIG. 1 is a flow chart of a photomask inspection method according to a first embodiment.

FIGS. 2, 3, 4, 5a, 5b, 6, 7a and 7b are explanatory views of the photomask inspection method according to the first embodiment.

DETAILED DESCRIPTION OF THE EMBODIMENTS

Figure 4A:
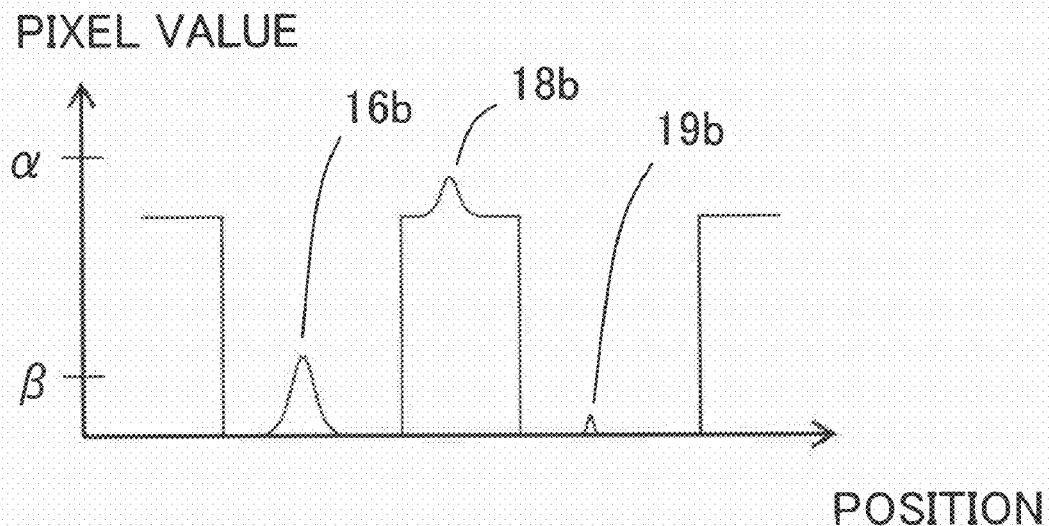

Photomask inspection methods according to embodiments of the present invention will be described below with reference to drawings.

First Embodiment

A photomask inspection method according to the present embodiment includes acquiring image data of a photomask having regions with different layer structures on a surface thereof, creating inverted image data by subtracting the image data from pixel value data of these regions, creating offset inverted image data by raising pixel values of the inverted image data by a fixed amount, creating normalized correlation image data by computing a normalized correlation of the offset inverted image data and a offset Gaussian distribution-type kernel, and identifying foreign particles by comparing the normalized correlation image data and a predetermined threshold.

FIG. 1 is a flow chart of the photomask inspection method according to the present embodiment. FIGS. 2 to 7 are explanatory views of the photomask inspection method according to the present embodiment.

A mask to be inspected has regions with different layer structures on the surface thereof. Here, an example of mask obtained by forming a pattern of halftone film on a glass substrate is taken. That is, the mask has two regions on the surface: a glass region of glass monolayer structure and a halftone film region of two-layer structure of glass/halftone film where the transmittance of inspection light is lower than the glass region.

First, as shown in FIG. 1, reflected image data of the mask region to be inspected is acquired (S10). FIG. 2 shows an example of reflected image data of a mask on which foreign particle is present. In reflected image data 10, a halftone film 12 is placed on glass 14, a foreign particle 16 is present on the halftone film 12, and another foreign particle 18 is present on the glass 14.

FIG. 3 shows an AA' cross section across the two foreign particles 16 and 18 of the reflected image data 10. Since foreign particles scatter light, such foreign particles appear as dark spots in an acquired image. A distortion 16a represents the foreign particle 16, and a distortion 18a represents the foreign particle 18. A distortion 19a represents noise that should not be identified as a foreign particle. It is assumed that the reflection intensity (pixel value data) of the glass region of the mask is β and the reflection intensity (pixel value data) of the halftone film region, which is blank, is α.

Next, inverted reflected image data is created by subtracting the acquired reflected image data from pixel value data of each region of locations to be inspected (S11). Pixel value data of each region, here pixel value data of each region of the glass 14 and the halftone film 12 can be obtained, for example, by measuring reflection intensity in a sufficiently wide area of each region before reflected image data of the mask is obtained. The pixel value of each pixel of the inverted reflected image data is obtained by subtracting the pixel value of each pixel of the acquired reflected image data from the pixel value data.

Figure 4B:
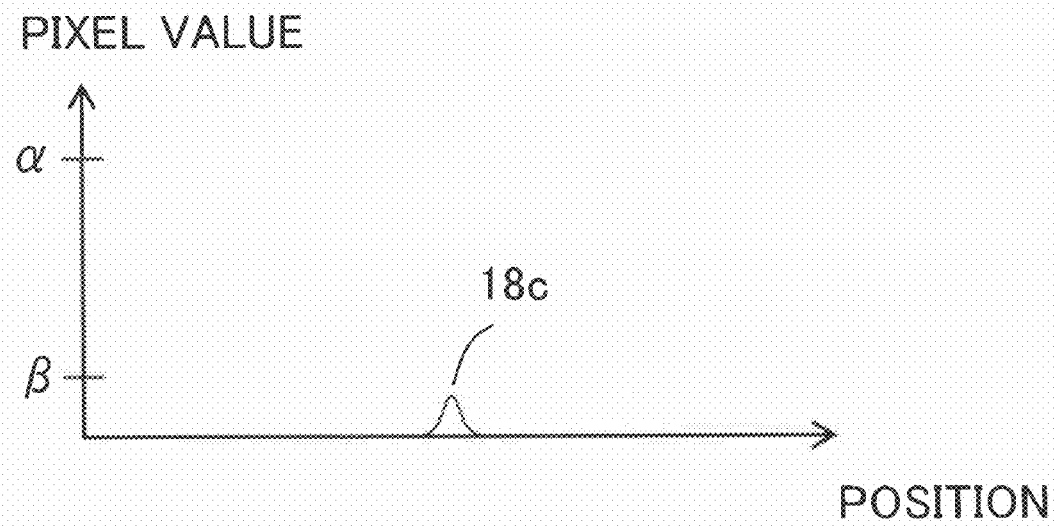

In the reflected image data in FIG. 3, the pixel value data has two kinds of reflection intensity, the reflection intensity α in the halftone film region and the reflection intensity β in the glass region, and thus, two kinds of inverted reflected image data are created. FIG. 4A and FIG. 4B show inverted reflected image data in the AA' cross section when the reflected image data 10 is subtracted from α and β respectively.

Next, offset inverted reflected image data obtained by raising the level of pixels values of the inverted reflected image data by a fixed amount is created (S12). Normalized correlation has a property of emphasizing patterns in a linear relationship to a kernel. Thus, the foreign particle 16 on the halftone film is considered to be identifiable from a distortion 16b in FIG. 4A and the foreign particle 18 on the glass from the distortion 18c in FIG. 4B by computing a normalized correlation of the inverted reflected image data and a Gaussian distribution-type kernel.

Figure 5A:
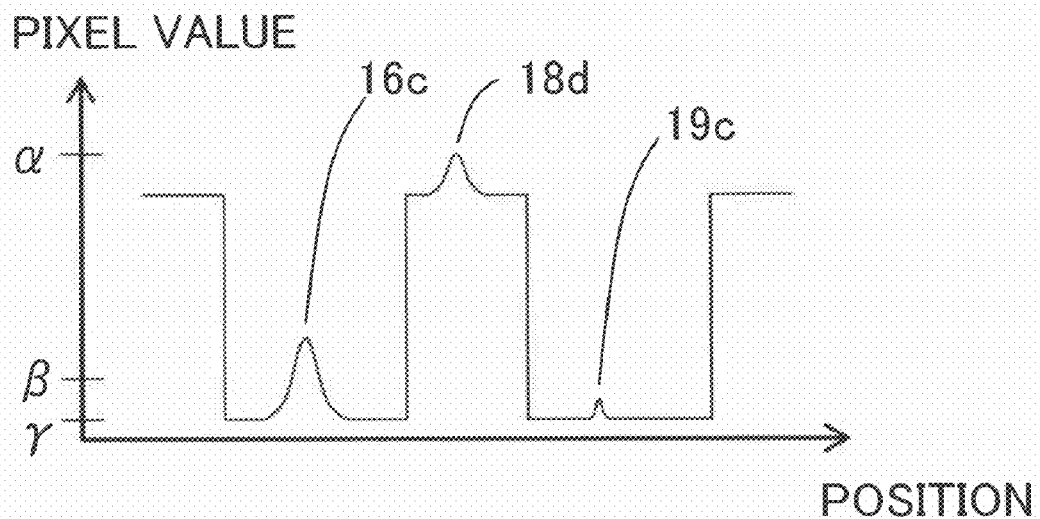
Figure 5B:
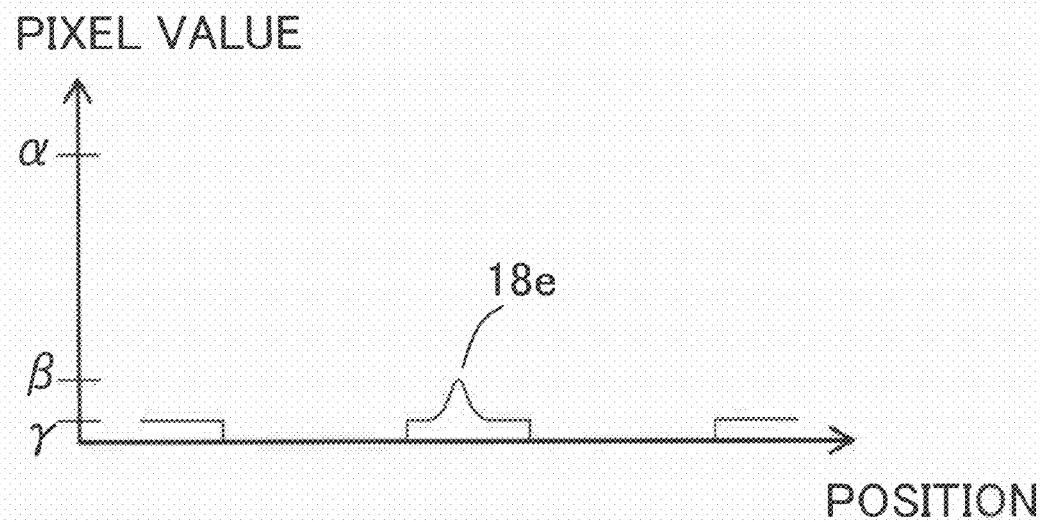

However, normalized correlation emphasizes all patterns in a linear relationship to a kernel at the same level. Thus, there is a possibility that a distortion 19b due to noise in FIG. 4A whose pixel value is lower than that of the distortion 16b or the distortion 18c caused by foreign particle is also identified as a foreign particle. In the present embodiment, as a means for easily solving this problem, pixel values of the inverted reflected image data in FIG. 4 are raised by a fixed amount. FIG. 5A and FIG. 5B show offset inverted reflected image data obtained by raising FIG. 4A and FIG. 4B by γ in pixel value respectively.

Figure 6:
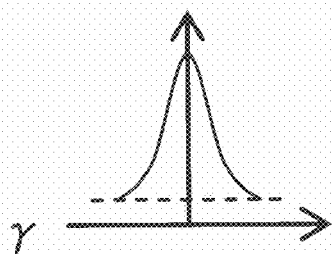

Next, normalized correlation reflected image data is created by computing a normalized correlation of the offset inverted reflected image data and a offset Gaussian distribution-type kernel (S13). FIG. 6 shows a Gaussian distribution-type kernel offset by γ.

If offset inverted reflected image data is represented as R, a offset Gaussian distribution-type kernel as k, a matrix of the same size as that of the Gaussian distribution-type kernel and whose elements are all 1 as I, and correlation operation as "∘", normalized correlation is generally expressed by the following formula (Mathematical expression 1):

$$\frac{k \cdot R}{\sqrt{I \cdot R^2} \sqrt{\sum_{i,j} k_{i,j}^2}} \quad \text{[Mathematical expression 1]}$$

The output image consists of pixels having values in the range of 0 and 1. However, if photomask inspection in the present embodiment is used as real-time processing, square root operations and management of a matrix with floating-point numbers are not desireable. As a countermeasure, as shown in the following mathematical expression, the above expression may be squared and multiplied by 1000 to yield an integer by round-off.

$$\text{Round}\left[\frac{1000(\text{Nonnegative}(k \cdot R))^2}{(I \cdot R^2)\left(\sum_{i,j} k_{i,j}^2\right)}\right] \quad \text{[Mathematical expression 2]}$$

In this case, a foreign particle threshold may similarly be squared and multiplied by 1000 to yield an integer by round-off. However, it is necessary to convert negative elements to zero before squaring for a correlation in the numerator to avoid a case in which a negative peak appears as a positive peak.

Figure 7A:
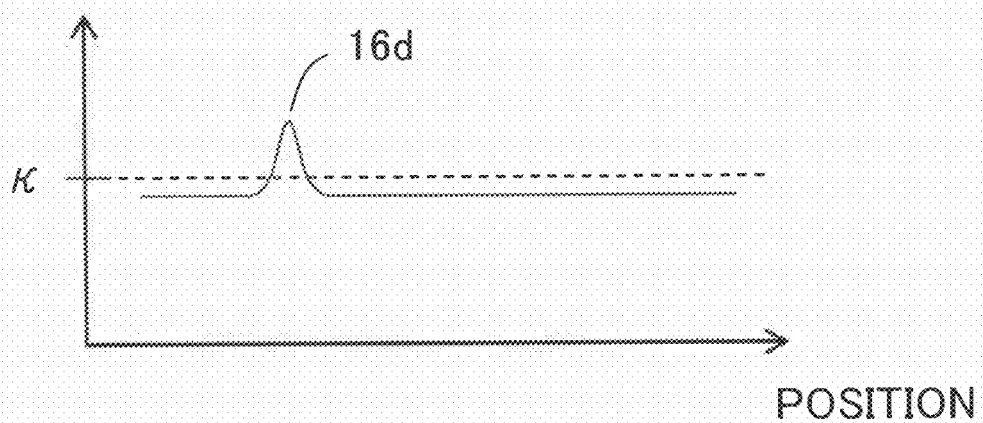
Figure 7B:
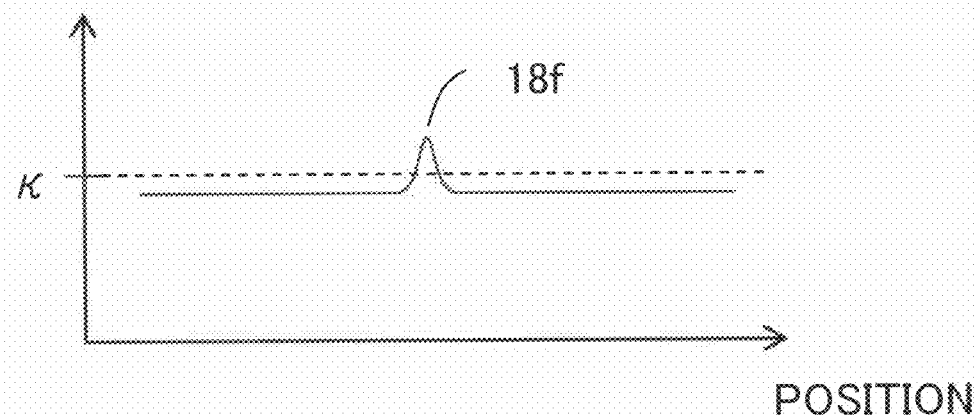

In normalized correlation reflected image data acquired in this manner, a distortion 16c in FIG. 5A is emphasized, no correlation is taken between a distortion 18d and the kernel, and an adequate correlation is taken between a distortion 18e in FIG. 5B and the kernel. On the other hand, a linear relationship to the kernel of a distortion 19c in FIG. 5A due to noise is significantly reduced due to a offset level so that identification thereof as a foreign particle will be excluded. FIG. 7A and FIG. 7B show normalized correlation reflected image data after normalized correlation is performed on data in FIG. 5A and FIG. 5B respectively.

Lastly, foreign particles are identified by comparing the obtained normalized correlation reflected image data and a predetermined threshold (S14). In FIG. 7A and FIG. 7B, a distortion 16d and a distortion 18f whose pixel value exceeds a threshold κ are identified as foreign particles. That is, while the foreign particle 16 and the foreign particle 18 present on the mask in FIG. 2 are identified as foreign particles in the inspection, a distortion due to noise is not identified as a foreign particle.

By using the normalized correlation in this manner, highly sensitive foreign particle identification can be implemented in which erroneous identification due to noise is reduced while being insensitive to the size of foreign particle. By using an inspection method using an algorithm that is less likely to miss identification of foreign particle in the vicinity of edges, though susceptible to erroneous identification, in combination with the photomask inspection method in the present embodiment, locations can be classified into those with a high probability of erroneous identification and those with a low probability.

Here, an example in which reflected image data obtained by detecting reflected light of inspection light is used as an original image is taken. However, a similar photomask inspection method can be executed by using transmitted image data obtained by detecting transmitted light of inspection light.

Here, an example in which the photomask to be inspected has two regions of a glass region and halftone film region on the surface is taken. However, the inspection method can also be applied to a photomask having three or more regions such as a glass region, halftone film region, chrome film region and the like on the surface. When regions of all kinds of layer structures of a photomask having three or more layer structures should be inspected, it is necessary to create as many pieces of image data as the number of layer structures thereof.

Here, the inverted reflected image data and Gaussian distribution-type kernel are raised by the same amount γ, but detection sensitivity may be adjusted by using different amounts to raise the level.

Second Embodiment

In the photomask inspection method in the present embodiment, the photomask inspection method in the first embodiment is applied to both a reflected image data and a transmitted image data of a photomask, and a foreign particle identified at the same position on the photomask in each inspection is determined as a true foreign particle. Therefore, a description of content overlapping with that of the first embodiment will be omitted.

Figure 8:
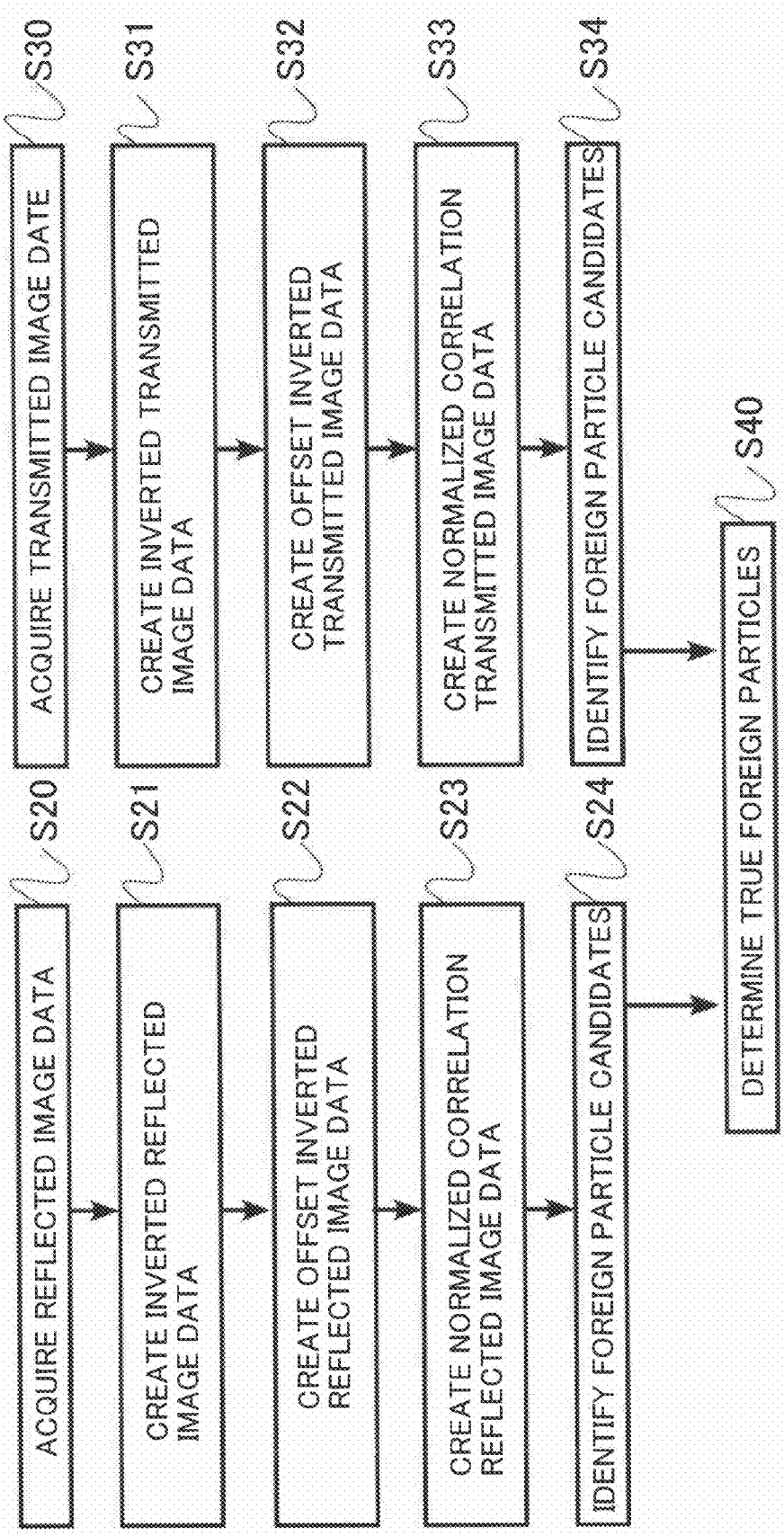
FIG. 8 is a flow chart of the photomask inspection method according to a second embodiment.

FIG. 8 is a flowchart of the photomask inspection method according to the present embodiment. Similar processing to that in the first embodiment is performed on reflected image data at S20 to S24 to identify foreign particle candidates. Similar processing is also performed on transmitted image data at S30 to S34 to identify foreign particle candidates.

Then, at S40, results of S24 and S34 are compared and a foreign particle identified at the same position on the mask in both the reflected image and transmitted image is determined as a true foreign particle. According to the present embodiment, erroneous identification can be further prevented by verifying that a foreign particle is identified by both a reflected image and a transmitted image.

A method of determining that a foreign particle is a true foreign particle only if the foreign particle is identified by both a reflected image and a transmitted image is described, but a method of determining that a foreign particle is a true foreign particle if the foreign particle is identified by either one of a reflected image and a transmitted image can be mentioned. In this case, while the probability of erroneously identifying a non-foreign particle as a foreign particle goes up, a foreign particle can reliably be identified as a foreign particle.

Third Embodiment

A photomask inspection method according to the present embodiment includes acquiring reflected image data and transmitted image data of a photomask having a glass region and a film region formed on the glass on a surface thereof, creating inverted reflected image data by subtracting the reflected image data from pixel value data of the glass region and the film region, creating offset inverted reflected image data by raising pixel values of the inverted reflected image data by a fixed amount, creating normalized correlation reflected image data by computing a normalized correlation of the offset inverted reflected image data and an offset Gaussian distribution-type kernel, identifying foreign particle candidates by comparing the normalized correlation reflected image data and a predetermined threshold, creating offset transmitted image data by subtracting the pixel value data of the film region from the transmitted image data and then raising the pixels values by the fixed amount, creating normalized correlation transmitted image data by computing a normalized correlation of the offset transmitted image data and the offset Gaussian distribution-type kernel, identifying holes by comparing the normalized correlation transmitted image data and the predetermined threshold, and determining, among the foreign particle candidates, those foreign particles that are not located at the same position as the holes as true foreign particles.

Figure 9:
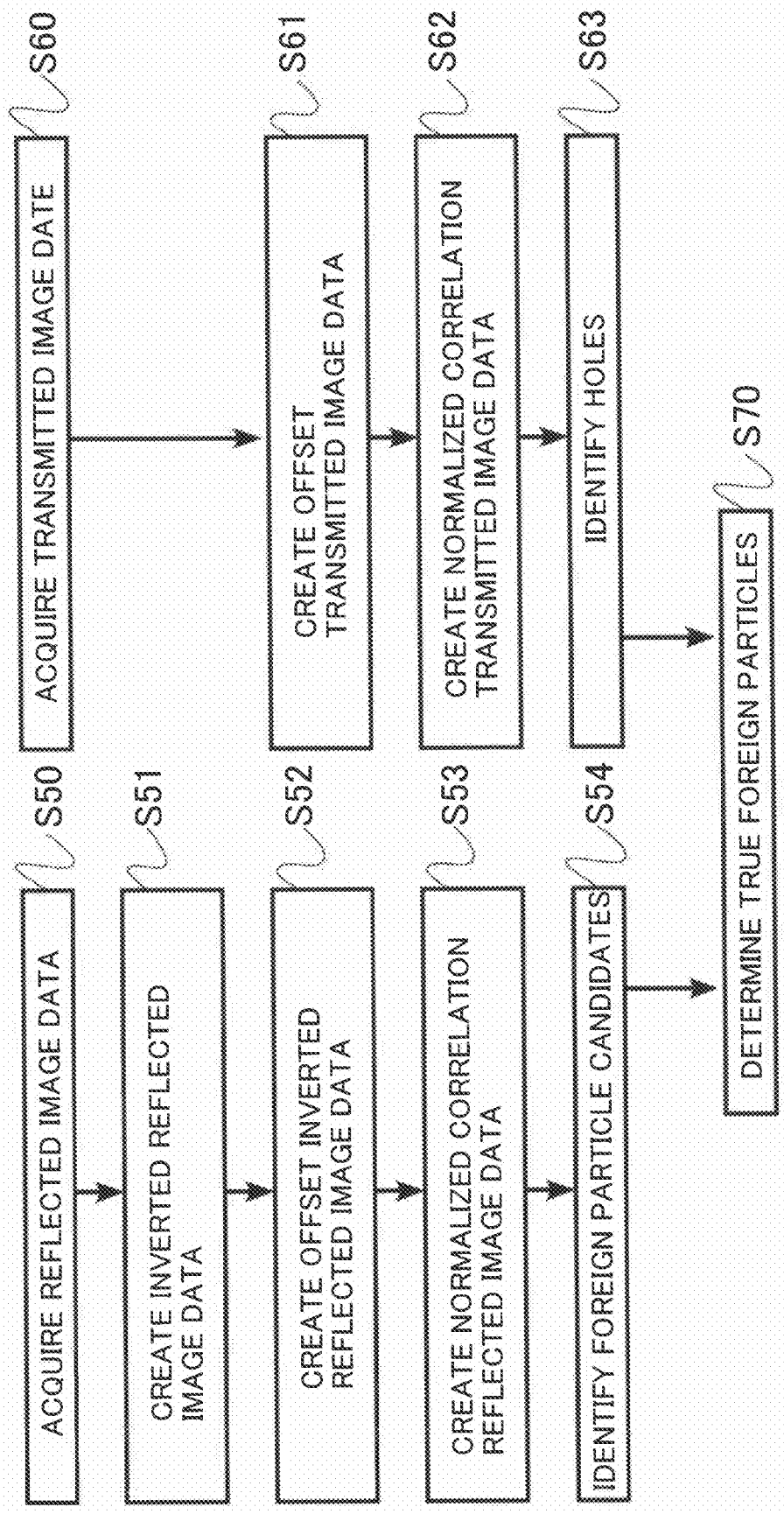
FIG. 9 is a flowchart of the photomask inspection method according to a third embodiment.
Figure 10:
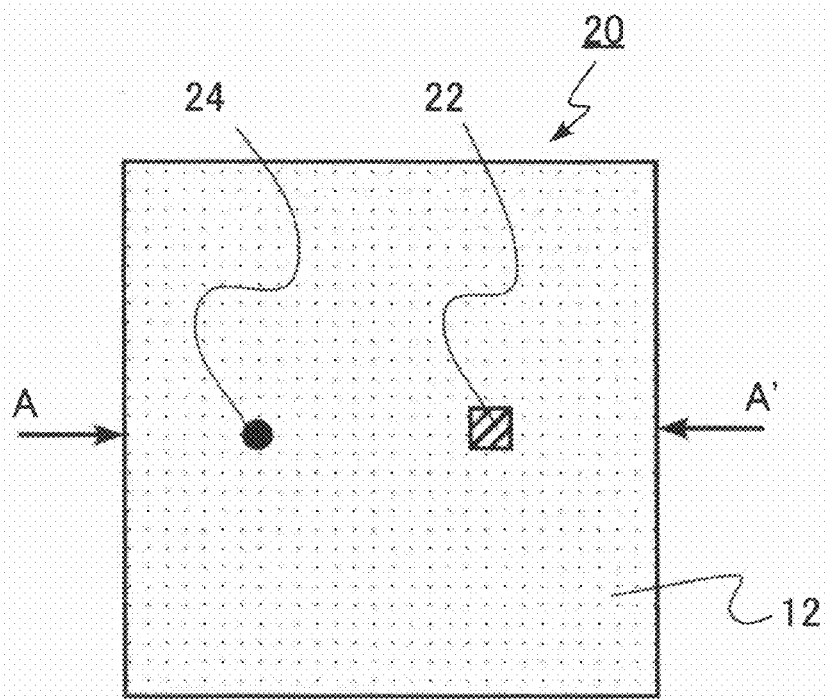
FIGS. 10, 11a, 11b, 12a and 12b are explanatory views of the photomask inspection method according to the third embodiment.

FIG. 9 is a flow chart of the photomask inspection method according to the present embodiment. FIGS. 10 to 12 are explanatory views of the photomask inspection method according to the present embodiment.

Similar processing to that in the first embodiment is performed on reflected image data at S50 to S54 to identify foreign particle candidates. Similar processing is performed on transmitted image data at S60 to S63 without performing image inversion to identify holes.

Figure 11A:
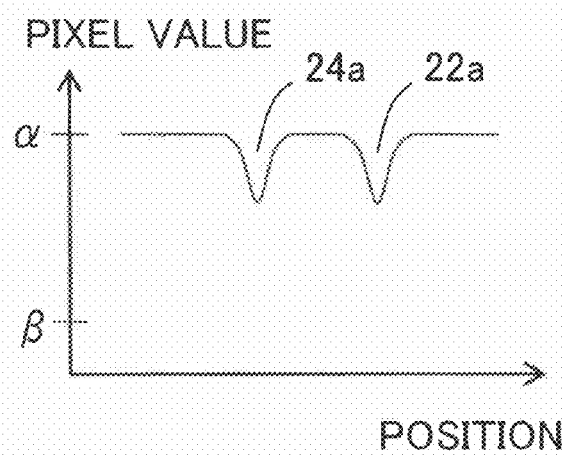
Figure 11B:
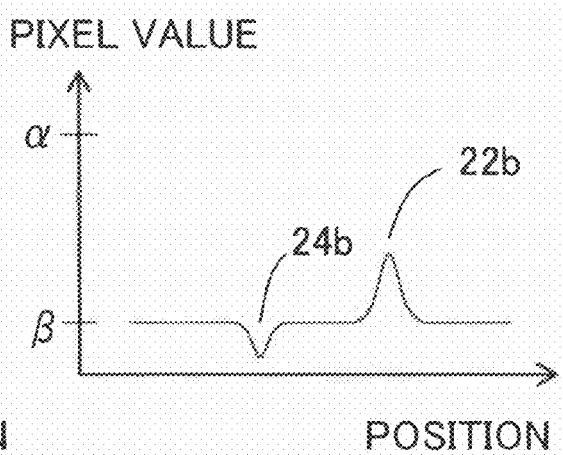

FIG. 10 shows an example of reflected image data of a mask on which foreign particle is present. In reflected image data 20, a foreign particle 24 is present on the halftone film 12 on glass in which a hole 22 (hole up to the glass) is formed. FIG. 11A shows an AA' cross section of the reflected image data 20 and FIG. 11B shows the AA' cross section of transmitted image data of the same mask.

As shown in FIG. 11A, a small hole has a distortion 22a that closely resembles a distortion 24a of the foreign particle in the reflected image data thereof and may not be distinguishable from the reflected image data alone. However, in contrast to a distortion 24b of the foreign particle represented darkly also in the transmitted image data, a distortion 22b of the hole is bright in the transmitted image data.

Figure 12A:
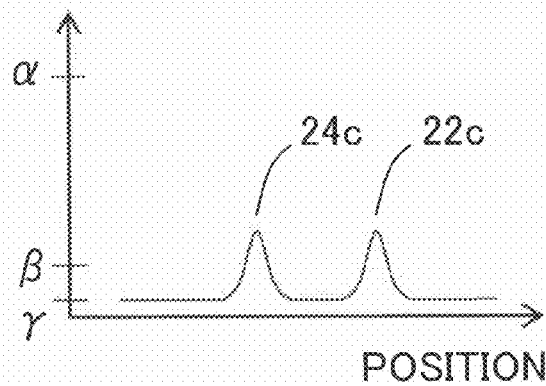
Figure 12B:
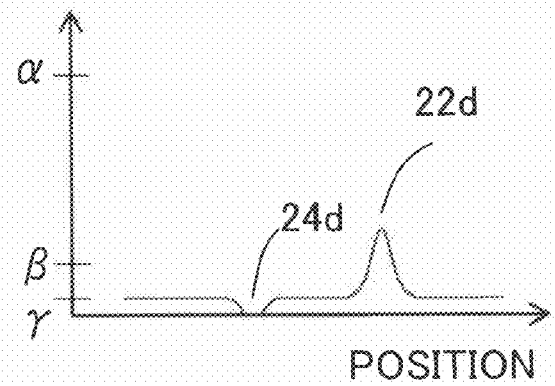
Figure 13:
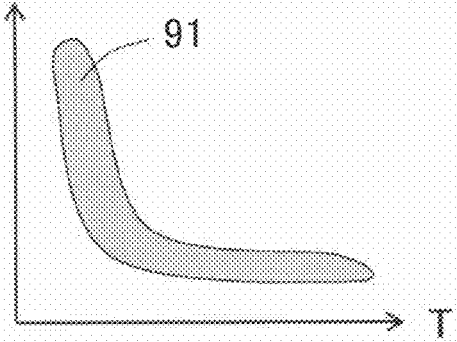
FIGS. 13 to 15 are explanatory views of the photomask inspection method of conventional technology.
Figure 14:
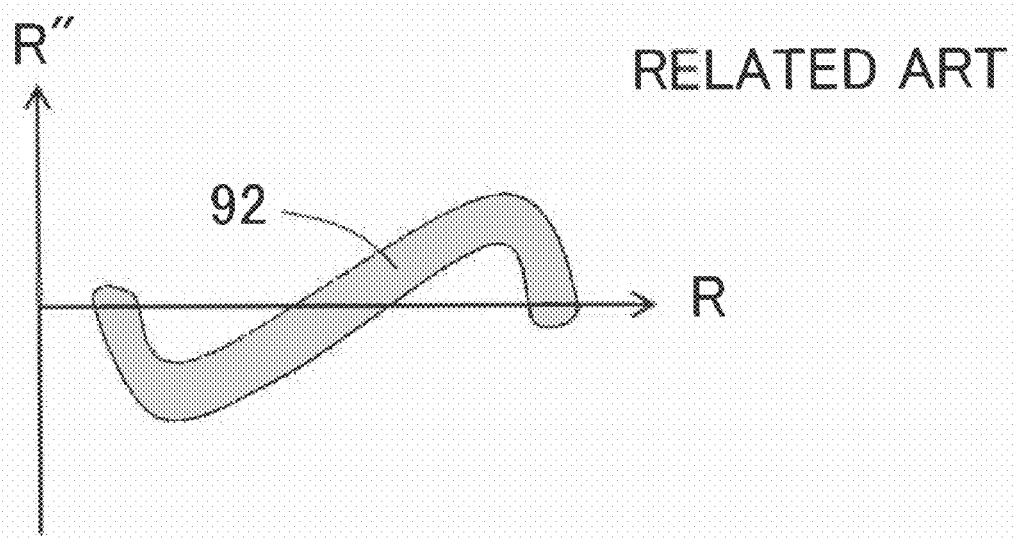
Figure 15:
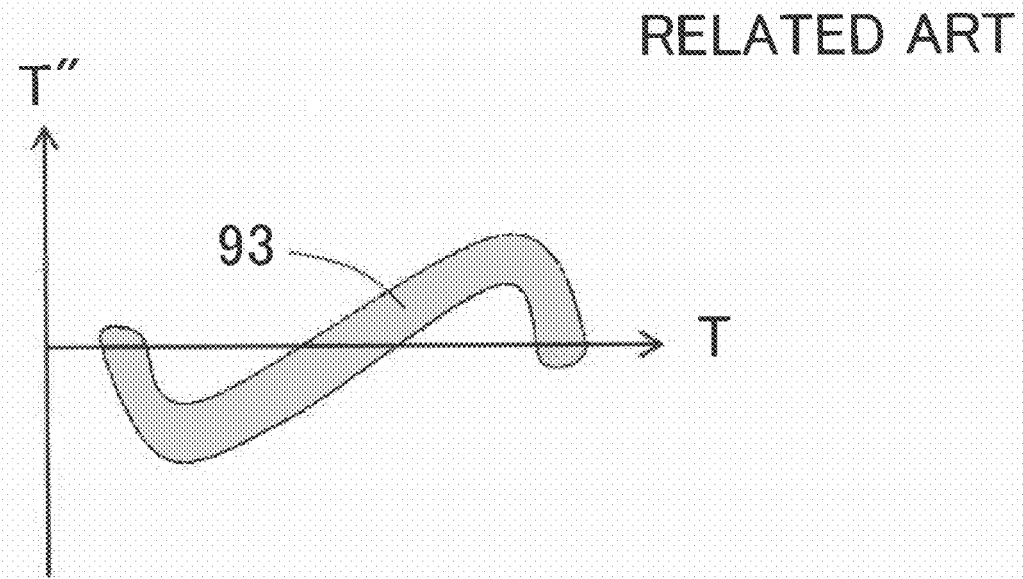

FIG. 12A shows offset inverted reflected image data created from the reflected image data and FIG. 12B shows offset inverted transmitted image data created from the transmitted image data. Following S61, as shown in FIG. 12B, a pixel value β of the halftone film portion is subtracted from the transmitted image data and the level is raised by γ. Accordingly, it becomes possible to identify a hole distortion 22d by using the offset Gaussian distribution-type kernel (S62 and S63).

Then, lastly if the position on the mask of a foreign particle candidate identified from the reflected image data at S54 and that of a hole identified from the transmitted image data at S63 do not match, the foreign particle is determined to be a true foreign particle (S70).

According to the present embodiment, a photomask inspection method capable of realizing highly sensitive foreign particle identification can be provided by having hole patterns that are likely to be erroneously identified in an inspection using reflected image data recognized as hole patterns with precision and removing such hole patterns from foreign particle candidates.

In the foregoing, embodiments of the present invention have been described with reference to concrete examples. However, the present invention is not limited to these concrete examples. While a description of portions such as the configuration of an inspection apparatus and an inspection method that are not directly needed to describe the present invention is omitted, the configuration of an inspection apparatus or an inspection method that is needed can be selected and used when necessary. In addition, all photomask inspection methods that have elements of the present invention and of which design can be modified when necessary by persons skilled in the art are included in the scope of the present invention.

What is claimed is:

1. A photomask inspection method, comprising:
   acquiring reflected image data and transmitted image data of a photomask having a glass region and a film region formed on the glass on a surface thereof;
   creating inverted reflected image data by subtracting the reflected image data from pixel value data of the glass region and the film region;
   creating offset inverted reflected image data by raising pixel values of the inverted reflected image data by a fixed amount;
   creating normalized correlation reflected image data by computing a normalized correlation of the offset inverted reflected image data and an offset Gaussian distribution-type kernel;
   identifying foreign particle candidates by comparing the normalized correlation reflected image data and a predetermined threshold;
   creating offset transmitted image data by subtracting the pixel value data of the film region from the transmitted image data and then raising the pixels values by the fixed amount;
   creating normalized correlation transmitted image data by computing a normalized correlation of the offset transmitted image data and the offset Gaussian distribution-type kernel;
   identifying holes by comparing the normalized correlation transmitted image data and the predetermined threshold; and
   determining, among the foreign particle candidates, those foreign particles that are not located at the same position as the holes as true foreign particles.

2. The method according to claim 1, wherein the photomask has two regions, a glass region and a film region where a transmittance to inspection light is lower than in the glass region, on the surface thereof.

* * * * *